Oct. 11, 1949.  R. E. LEWIS  2,484,103
PROJECTION COMPARATOR FOR OBJECTS IN RELATION
TO SPACED DRAWINGS OR RETICLES
Filed Aug. 20, 1947  3 Sheets-Sheet 2
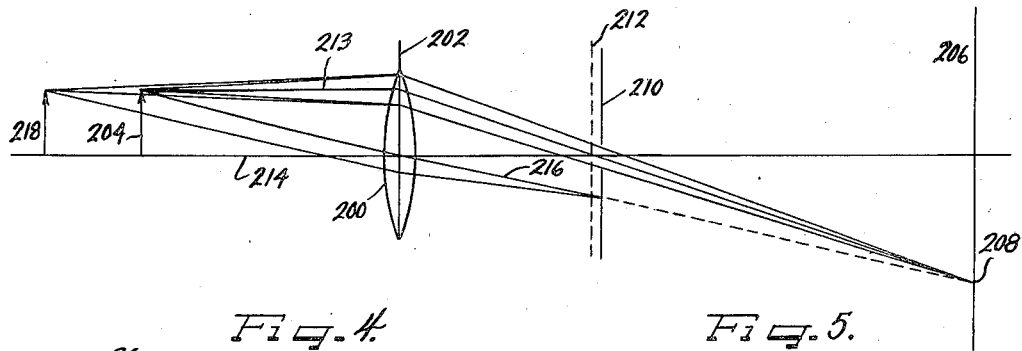
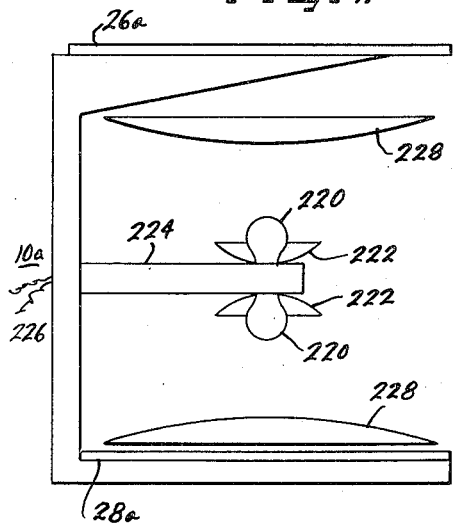
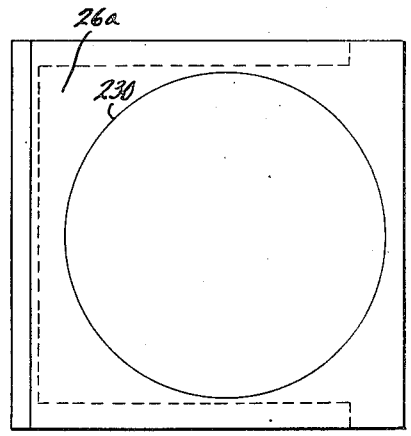
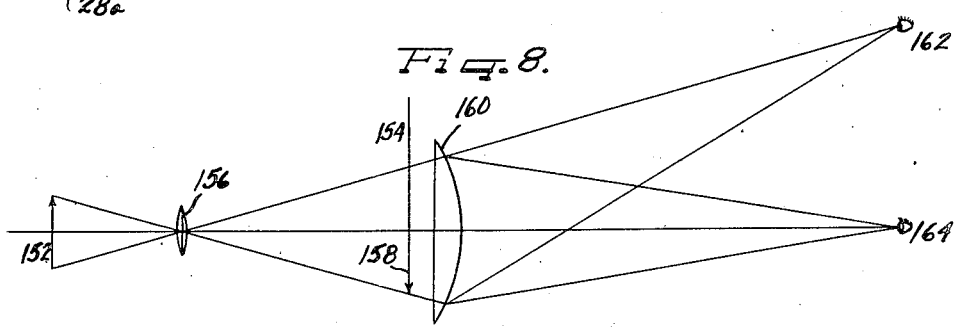
Inventor
ROBERT E. LEWIS
by
Attys.

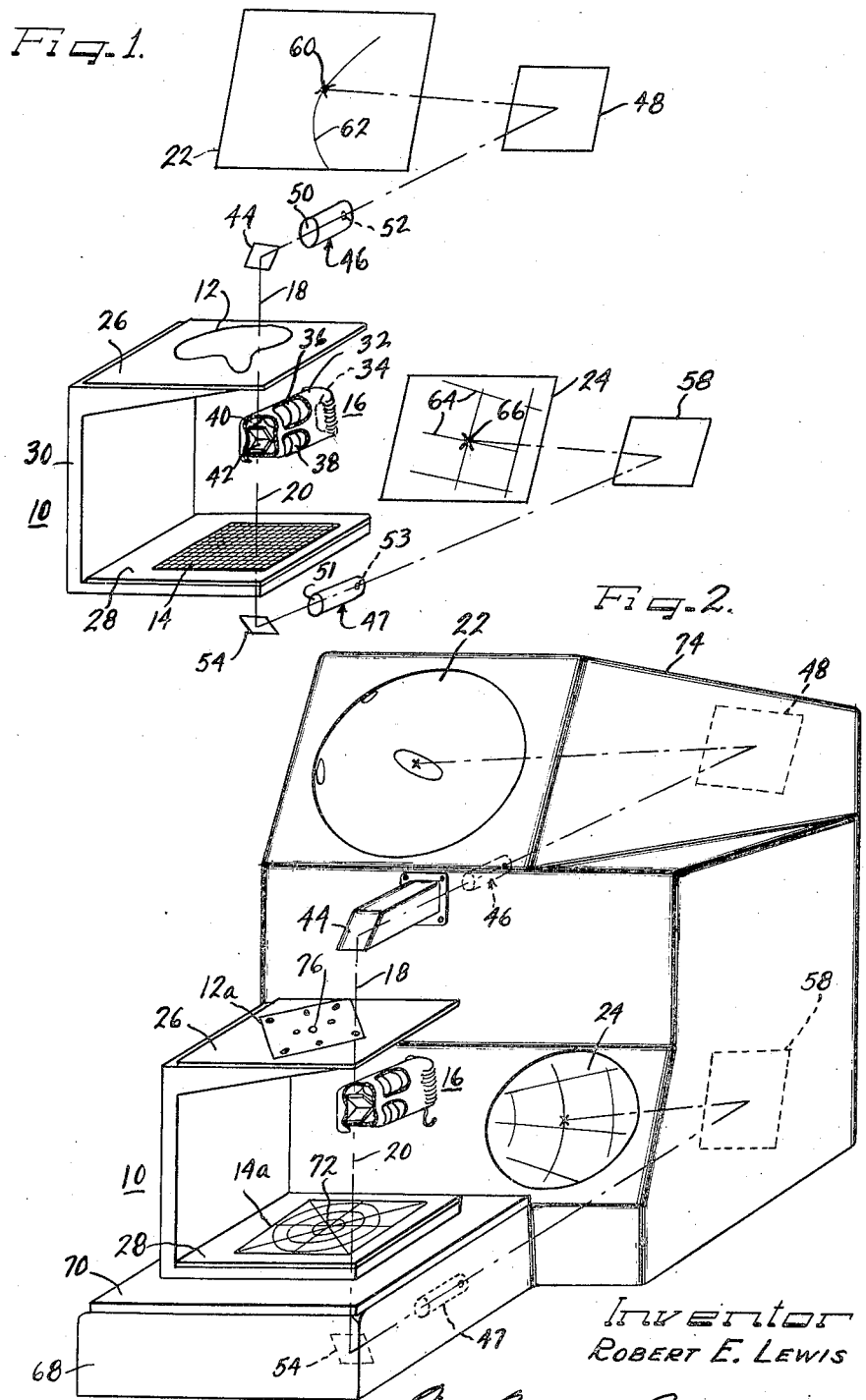

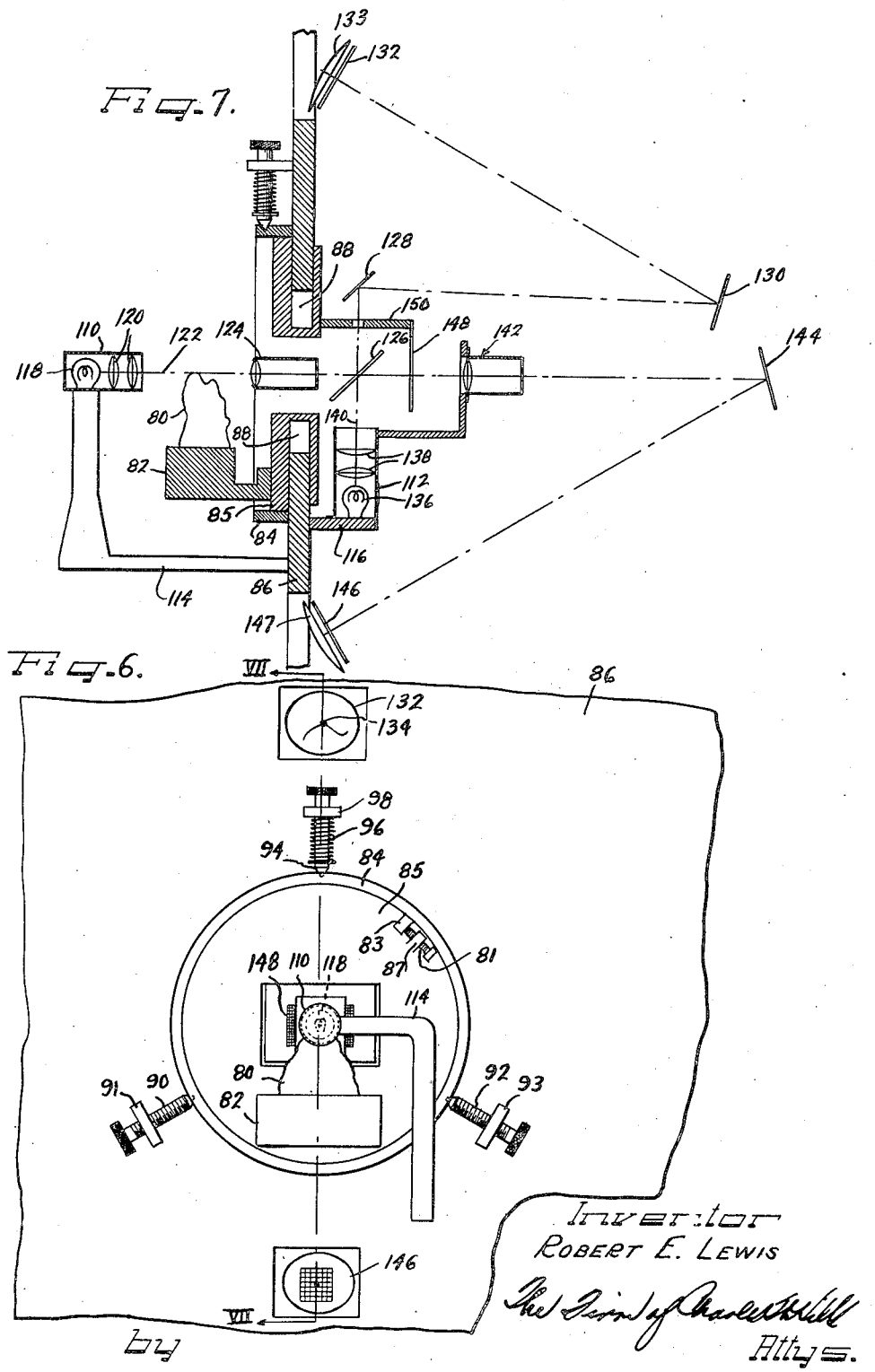

Patented Oct. 11, 1949

2,484,103

UNITED STATES PATENT OFFICE 2,484,103

PROJECTION COMPARATOR FOR OBJECTS IN RELATION TO SPACED DRAWINGS OR RETICLES

Robert E. Lewis, Chicago, Ill., assignor, by mesne assignments, to Jones & Lamson Machine Company, Springfield, Vt., a corporation of Vermont Application August 20, 1947, Serial No. 769,573

10 Claims. (Cl. 88—24)

My invention relates to reticle comparators for two-dimensional measurement and inspection by reference along an axis to a measurement or coordinate system in a corresponding plane.

Accurate measurement of distance and direction has heretofore required precision screws and gauge blocks or similar devices. This method inherently requires considerable labor in manipulating the equipment and interpreting the results as well as progressively increasing errors as the frictionally engaging components wear. Moreover, this method and similar previous methods demand that measurements be taken along mutually perpendicular axes, thereby causing errors in accord with the extent the actual axes from which measurements are taken depart from these axes and preventing the direct measurement of distances on non-rectangular coordinate systems such as polar coordinates. In accordance with the present invention these disadvantages heretofore encountered in precision measuring apparatus are eliminated by the use of precision ruled objects such as gratings, together with an optical system to project on appropriate viewing screens of a pair of images indicative of the position or coordinates of the projection of a point on a predetermined two-dimensional coordinate system or similar pattern or drawing.

It is accordingly a general object of the present invention to provide an improved device to determine accurately the point-to-point relationships between two planes.

A further object of the present invention is to provide an improved device to determine accurately the point-to-point relationship between a plane and the profile of a three dimensional object as projected upon a plane.

It is another object of the present invention to provide an improved device to determine the point-to-point relationship between two planes which has the features of construction, combination, and arrangement whereby the position of a point may be determined with reference to any desired coordinate or reference system and is not limited to the use of rectangular or cartesian coordinates.

Still another object of the present invention is to provide an improved device to determine the point-to-point relationship of an object relative to a plane and which has features of construction, combination and arrangement, rendering it inexpensive to manufacture and reliable in operation to the end that a mechanism having maximum utility is achieved.

Yet another object of the present invention is to provide an improved device to determine the point-to-point relationship of an object relative to a plane, which mechanism includes no wearing parts and hence remains accurate and exact even after long periods of use.

It is a further object of the present invention to provide an improved device enabling the use of accurate dimensional drawings for measurement of the dimensions of objects. The arrangement of the system enables the use of drawings the size of the entire part without being limited to the area of the screen. Accurate drawings or other reference systems are interchanged with the coordinate system in use.

Yet another object of the present invention is to provide an improved measuring device wherein only a small portion of the object under measurement is projected on the viewing screen to the end that the size of the object or reference drawing is not limited by the size of the viewing screen.

The novel features believed to be characteristic of the present invention are set forth with particularity in the appended claims. The invention itself, however, both as to its organization and method of operation, together with further objects and advantages thereof, may best be understood by reference to the following description taken in connection with the accompanying drawings:

On the drawings:

Figure 1 is a somewhat diagrammatic isometric view of an embodiment of the present invention;

Figure 2 is a view of the apparatus of Figure 1 as it might be installed in a suitable cabinet and showing the application of this invention to the measurement of X-ray diffraction patterns;

Figure 3 is a diagram illustrating the operation of one form of telecentric lens system suitable for use in the apparatus of the present invention;

Figures 4 and 5 are side elevational views and top plan views, respectively, of a modified form of the support structure of the apparatus of Figures 1 and 2;

Figures 6 and 7 are front elevational views and side cross sectional views, respectively, of a modified form of the present invention; and Figure 8 is a diagram illustrating the operation of a field lens suitable for use with the apparatus of the present invention.

As shown on the drawings:

Referring now to Figure 1, there is shown generally at 10 a supporting structure upon which an object 12 to be measured and ruled grating 14 are positioned. As illustrated the object 12 may be a flat plate whose contours in direction perpendicular to the thickness are to be determined. A light source, shown generally at 16, provides illumination for viewing object 12 and grating 14, the illumination being directed upward along the axis 18 to provide illumination for the viewing of object 12 upon viewing screen 22 and also down along axis 20 to provide illumination for the viewing of the ruled grating 14 on the screen 24. The upper axis 18 is identical with the lower axis 20, the designations upper and lower being merely for convenience in separating optical system.

In accord with the principles of the present invention, the positions of projections of points on object 12 relative to the two-dimensional coordinate system ruled on grating 14 are ascertained by observing the image on viewing screen 24 as the support 10 is shifted to position object 12 so that the point desired to be located is coincident with the axes 18 and 20. This condition exists when the portion of the image on the screen 22 corresponding to the point to be located is coincident with the fiducial mark 60. The location of this portion of object 12 will be indicated by the portion of the grating 14 intersecting the axis 20 which will be shown on the screen 24 coincident with the fiducial mark 66. Thus, for any point on object 12 made coincident with the axis 18 by movement of support 10, there is a corresponding point on grating 14, coincident with axis 20, both points appearing coincident with the fiducial marks of the viewing screens 22 and 24. The apparatus of this invention is accordingly referred to herein as apparatus for two-dimensional measurement by reference along an axis to a measurement or coordinate system in a corresponding plane.

The supporting structure 10 upon which grating 14 and object 12 are mounted includes an upper structure 26 which supports object 12 and which is transparent to permit a bundle of rays surrounding axis 18 to pass therethrough except as object 12 obstructs their passage. The support 10 further includes a lower structure 28 to support grating 14, this structure likewise being transparent to permit passage of a bundle of rays surrounding axis 20. Support 10 further includes web section 30 which rigidly supports sections 26 and 28 relative to each other in a plane parallel relationship perpendicular to the common axis of axes 18 and 20.

The light source, shown generally at 16, includes a casing 32 in which is mounted a lamp 34 and two separate condensing lens systems 36 and 38 which produce parallel beams of light directed at mirrors 40 and 42. The mirrors 40 and 42 are supported within housing 32 so that the rays are directed upwardly and downwardly along 18 and 20, namely, along a single axis perpendicular to the sections 26 and 28 of support 10.

The rays directed upwardly along axis 18 pass through the upper structure 26 of support 10 and are reflected to telecentric lens system 46 by reflector 44. Upon passing through this lens system the rays are again deflected by reflector 48 and impinge on viewing screen 22 to form an image thereon.

The rays directed downwardly along axis 20 by mirror 42 pass through grating 14 and are deflected by reflector 54 to pass through the telecentric lens system shown generally at 47. Upon passing through this lens system the rays impinge upon reflector 58 which deflects them to viewing screen 24 to produce an image thereon.

The telecentric lens systems 46 and 47 are adapted to focus points on object 12 and grating 14 on viewing screens 22 and 24, respectively, while causing minimum error in the position of the image due to the depth of object 12 and grating 14 in direction parallel to the common axes 18 and 20. To this end, telecentric lens system 46 includes a lens 50 to focus the image of object 12 on viewing screen 22 and telecentric lens system 47 includes lens 51 to focus points on grating 14 on viewing screen 24. In addition, telecentric lens systems 46 and 47 include apertures or stops 52 and 53 whose function in avoiding distortions of the images due to depth of object 12 and grating 14 in direction parallel to the common axis of ray beams 18 and 20 is described in further detail hereafter.

The support 10 is mounted for shifting movement on a plane perpendicular to the axes 18 and 20 to enable object 12 and grating 14 to be moved simultaneously with respect to these axes. Movement of the support 10 causes a movement of the object 12 and grating 14 which in turn appears as movement of the images on screens 22 and 24 respectively. The points of impingement of the axes 18 and 20 on object 12 and grating 14 are indicated on the images by the fiducial crosspoints 60 and 66 on screens 22 and 24 respectively. Object 12, shown as 62 on screen 22, and the grating or other reference system 14, shown as 64 on screen 24, will move together as support 10 is shifted.

Inasmuch as the fiducial cross-point on viewing screen 22 corresponds to the point at which the ray beam directed along axis 18 passes upwardly by object 12 and the fiducial cross-point on viewing screen 24 corresponds to the point at which the ray beam directed along axis 20 passes downwardly through grating 14, and 18 and 20 are on a common axis, the coordinates of points on object 12 may be determined by shifting support 10 to cause a ray corresponding to the axis 18 to traverse the edges of object 12. At each setting of position of the support 10, the coordinates may be determined by observing screen 24 whereupon the location of the image of several rulings of the grating with regard to the fiducial crosspoint indicates the coordinate dimension sought. In the case wherein a scale drawing of a part has been substituted for the grating 14, the fiducial indication would indicate whether the location corresponded to the position on the drawing.

In the view of Figure 2 a complete structure constructed in accordance with the embodiment of my invention shown in Figure 1 is illustrated. In this structure the support structure 10 is shown positioned to move in either direction on support 68. This is accomplished by the use of a flat plate 70 upon which support 10 rides, this plate comprising, for example, a glass plate. The entire unit is encased in housing 74 which supports viewing screens 22 and 24 in position to be readily observed. The remaining elements of the mechanism of Figure 2 correspond with the correspondingly identified portions of the structure of Figure 1.

In Figure 2 the application of the present invention to determination of points on an object with respect to polar coordinates is illustrated, the illustration showing the determination of the coordinates of the points on a film 12a of the type typical of those obtained with X-ray diffraction patterns. In this case, a polar coordinate system, which may, for example, be a grating 14a, is positioned on lower structure 28 at a point such that the center 72 thereof corresponds with the center 76 of film 12a. As is shown in the figure, an enlarged image of film 12a appears upon viewing screen 22 and support 10 may readily be shifted until the fiducial mark on the screen corresponds to an indicated point on the X-ray film. The coordinates of that point relative to the polar coordinate system of grating 14a may then be ascertained from the enlarged view shown on viewing screen 24.

It will be observed that the support 10 may be shifted in any direction upon plate 70 and may be rotated about any axis perpendicular thereto without altering the accuracy of the measurements achieved. Thus, for example, if it is desired to ascertain the distances of a plurality of points on film 12a from a particular mark spaced from the center 76 thereof, it is merely necessary to shift grating 14a until the center 72 thereof coincides with the mark from which measurements are desired and then to read the radius arm on viewing screen 24 as 10 is shifted to cause the points to intersect the axes 18 and 20, a movement that is easily accomplished since support 10 is free to shift or rotate in any direction as it rests upon plate 70. If axes 18 and 20 were not the same axis, this universal rotational and translational movement would be impossible, and, as a consequence, the mechanism would not be useful with all types of coordinate systems and would not permit the universal measurement described above.

In order that the measurements achieved with the equipment of Figures 1 and 2 may accurately represent the contours or points on object 12 as projected on a plane perpendicular to axes 18 and 20, or, viewed differently, the measurements may accurately represent the coordinates of points on object 12 with respect to an axis parallel to the axes 18 and 20, it is necessary that the images on the viewing screens 22 and 24 be independent of the depth of object 12 and grating 14 in the direction of the axis of ray beams 18 and 20. To this end, telecentric lens systems 46 and 47 are utilized to focus the rays along 18 and 20 on viewing screens 22 and 24 respectively. These systems may be any one of several constructions well known in the art for this purpose, the systems shown being of the type using telecentric stops 52 and 53 located near the emergent focal plane of lenses 50 and 51 respectively. Operation of this type of lens systems will be evident from examination of the diagrammatic view of the telecentric system shown generally in Figure 3.

In the view of Figure 3, a lens 200 having a principal plane 202 is shown. This lens is constructed to focus the image of an object 204 upon viewing screen 206, the upper point of object 204 appearing at point 208 on viewing screen 206. A stop 210 is disposed near the emergent focal plane 212 of lens 200, the emergent focal plane being the plane through the point at which the ray 213 passes through the axis 214 of that lens, ray 213 being the ray parallel to the axis of lens 200 upon incidence. The stop 210 intercepts rays deviating greatly from the ray 213, such as ray 216, and prevents them from producing an image on viewing screen 206.

If a second object, such as 218, is of the same height from the axis 214 as object 204 and is located some other distance from lens 200, it will be apparent that the image thereof on viewing screen 206 will appear in the same position and the same size as the corresponding object 204 for the reason that the stop 210 intercepts all rays such as are shown drawn in Figure 3 from object 218 to intersection of the principal plane 202 below axis 214, which would produce a displaced image.

Figures 4 and 5 show side elevational and top plan views, respectively, of a modified form of support 10. In accordance with this modification upper portion 26a of that support and lower portion 28a of that support are illuminated to a uniform degree with bundles of light rays projecting perpendicular thereto. This illumination is provided by a pair of lamps 220 and reflectors 222 which are supported on arm 224. Inasmuch as electrical energy is supplied to lamps 220 through a flexible cord 226 or a trolley it will be evident that this structure permits rotation of the structure 10a over many complete turns about the axis of lamps 220. A pair of condensing lenses 228 are provided to deflect the light rays from lamps 220 to common axes perpendicular to the surfaces of portions 26a and 28a of support 10a, thereby producing a circular illuminated area as seen at 230, Figure 5.

With the modified form of this invention shown in Figures 4 and 5, the necessity of having a fixed illumination system aligned with the optical axes 18 and 20 is avoided. Since the emergent light rays are parallel to the axes 18 and 20 they are so aligned that any movement of the carriage 10a does not cause a loss of illumination falling upon the lens systems until movement is sufficient to place the axes 18 and 20 outside the useful area 230. The embodiments shown in Figures 4 and 5 therefore constitute a system enabling complete freedom of movement of the support 10a and enable the same illumination system to be used for any lens of entrance pupil diameter equal to or less than 230.

Figures 6 and 7 are front elevational and cross-sectional views, respectively, of a further embodiment of the present invention. In this embodiment, the object to be examined, 80, is supported on mounting plate 82, the latter being supported from plates 84 and 85. Plates 84 and 85 are movably supported within the support plate 86 and permit moving of the object relative thereto on a plane parallel to the plane of plate 86. An optical system fixedly supported relative to plate 86 produces a pair of images on viewing screens 132 and 146 and thereby permits measurement of the contours of object 80 by appropriately shifting plates 84 and 85.

Plates 84 and 85 are of circular configuration at their adjoining edges and may be rotated relative to each other about the common axis of these edges by screw 81 which is in threaded engagement with arms 83 and 87 on plates 84 and 85 respectively. Plates 84 and 85 may be shifted in translational movement or rotational movement about an axis other than the center of the common edge of plates 84 and 85 by shift screws 90 and 92 which are in threaded engagement with flanges 91 and 93 of plate 86, respectively. The action of these screws is opposed by pin 94 which is biased by spring 96 acting against extension 98 of support plate 86.

The optical system of the embodiment of my invention shown in Figures 6 and 7 includes two sources of illumination 110 and 112 which are supported from plate 86 by brackets 114 and 116 respectively. Source 110 includes lamp 118 and lenses 120 to produce illumination directed along an axis 122 perpendicular to the plane of movement of plate 85. The illumination from 110 passes through telecentric focusing system 124, to reflector 126 which deflects the ray vertically to reflector 128. From reflector 128 the ray beam impinges upon reflector 130 where it is deflected in direction to impinge upon viewing screen 132. The telecentric optical system 124 is of like construction with the telecentric system 46 of Figure 1 and is disposed to focus upon viewing screen 132 the area at which the illumination from 110 impinges upon object 80 so that the image on viewing screen shows the outline of object 80, the fiducial mark 134 corresponding to the point at which the axial ray 122 impinges thereon.

The light source 112 includes a lamp 136 and condensing lenses 138 to produce an illumination along 140 which impinges upon the surface of reflector 126 to be directed toward the telecentric lens system 142. Upon passing through the lens system 142, the rays impinge upon reflector 144 and are deflected therefrom to viewing screen 146. A ruled grating 148 is disposed between reflector 126 and lens system 142 in such a manner as to be imaged on screen 146. Grating 148 is supported by bracket 150 from plate 85. This grating moves in accord with the movements of object 80.

In the embodiment shown in Figures 6 and 7, it will be evident that the contours of object 80 as measured from an axis perpendicular to the plane of motion of plate 85 may be determined by suitably adjusting screws 90, 92 and 81 to move that object as necessary to cause the axial ray 122 to impinge upon the contours thereof. The reading from the viewing screens 132 and 146 may be taken in like manner as in the case of the embodiment of this invention shown in Figures 1 and 2.

In the apparatus of Figures 6 and 7 a pair of field lenses 133 and 147 are disposed over the viewing screens 132 and 146. It is the purpose of these lenses to cause the image on the viewing screens 132 and 146 to appear of the same relative intensity regardless of the portion of the screen observed from the usual position of the operator. The operation of these field lenses will be evident from Figure 8, which shows a diagrammatic view indicating the operation thereof.

In the illustration of Figure 8 an image of object 152 is focused upon viewing screen 154 by lens 156, the image being identified at 158. The lens 160 is designed to focus the objective (lens 156) onto the pupil of the eye at 164. If the diameter of 156 is great enough, the image of 156 may extend as far as 162, otherwise a small diffusion such as found by means of a ground glass in the screen position 154 may be required to enable use of 162 as a position of view for an operator. It can be shown that in position 164 no ground glass is necessary when field lens 160 is used and that the illumination over the entire image will be brilliant and of better relative intensity across it than the ground glass without lens 160. Likewise, when viewed from 162, the ground glass screen with 160 in place will make image 158 appear to have better evenness of illumination than the ground glass without 160.

It will be apparent to those skilled in the art that the apparatus of Figure 2, for example, may include only a single viewing screen, and the reflectors arranged to display both images thereon. Moreover, the optical system may be arranged to display the fiducial point of each image at a common point on the screen. In this case, an image of the object will be seen with the coordinate system of grating 14a superimposed thereon, thereby permitting direct evaluation of the coordinates of various points on the object 12a from a single image. The images may be of the same magnification, though not necessarily so. They may also be lighted alternately, using the same screen, to avoid the possible confusion of viewing both images at once.

From the above description it will be evident that I have provided an improved comparator which is not reliant for measurement upon any mechanical system nor restricted to the use of rectangular or cartesian coordinates. In particular, no precision screw threads or gauge blocks are required and measurements are made from an accurately ruled grating, a relatively inexpensive precision instrument.

While I prefer to use a transparent grating because of its economy and ease of use, it will be apparent that opaque materials, such as porcelain, metal, glass, or plastics may be used for this purpose. Moreover, while I have shown a telecentric viewing system in connection with the viewing of both the object examined and the grating, it will be apparent to those skilled in the art that with a shallow grating or a flat object, one or more telecentric systems may be eliminated and a conventional lens substituted.

In the appended claims I have used the term "drawing" to indicate any two dimensional reference body marked in accord with a coordinate system, photograph, machine drawing, or similar markings with respect to which the positions of points on an object are to be ascertained.

In the appended claims I have further used the term "fixed coincident light rays" to define the particular light rays corresponding to the fiducial markings on the viewing screen of the apparatus of the present invention. While I have referred to these rays as "fixed", it will, of course, be apparent that they are fixed only with reference to the shifting movement of the objects and the reference drawing and that either or both of these may be movable relative to any particular point in space.

It will, of course, be understood that various details of construction of this invention may be varied through a wide range without departing from the principles and scope thereof, and it is, therefore, not my purpose to limit the patent granted hereon otherwise than necessitated by the scope of the appended claims.

I claim as my invention:

1. An apparatus for accurately determining the contour of an object relative to a two-dimensional reference system including means supporting said object for shifting movements in a plane parallel to the plane of said reference system and bearing a drawing mounted in a plane parallel to the plane of said reference system, mechanism operative to produce oppositely directed bundles of light rays directed perpendicularly of the plane of said system, said mechanism being disposed to cause one of said bundles to impinge upon said object and the other of said bundles to impinge upon said drawing, a pair of fixedly supported viewing screens, an optical system to display on one of said viewing screens the image of said object at the point one of said bundles of rays impinges thereon and to display on the other of said viewing screens an image of said drawing at the point the other of said bundles of rays impinges thereon, said viewing screens each having fiducial marking corresponding to the points on the images due to fixed coincident light rays.

2. An apparatus to determine the positions of points on an object relative to a reference drawing including a support member to support said drawing and said object in spaced relation, means to sustain said support member for shifting movements in a plane parallel to the plane of said drawing, fixedly mounted mechanism disposed between said object and said drawing and operative to produce oppositely directed light rays perpendicular to the plane of said drawing, means to produce images of said object and said drawing as illuminated by said rays, and elements to identify the points on said images corresponding to fixed coincident light rays, whereby the positions of said points may be determined by shifting said support member and observing the identified points on said images.

3. An apparatus to determine the positions of points on a three-dimensional object relative to a reference drawing including a support member to support said drawing and said object in spaced relation, means to sustain said support member for shifting movements in a plane parallel to the plane of said drawing, fixedly mounted mechanism disposed between said object and said drawing and operative to produce oppositely directed light rays perpendicular to the plane of said drawing, means to produce images of said object and said drawing as illuminated by said rays, said means including a telecentric lens system to render the image of said object independent of the distance in the direction of said light rays, and elements to identify points on said images corresponding to fixed coincident light rays.

4. A device to measure accurately the position of points on an object relative to a predetermined two-dimensional coordinate system including a support for said object, said support being shiftable in a plane parallel to the plane of said system and having a drawing spaced from said object and positioned in a plane parallel to the plane of said system, mechanism operative to produce two bundles of light rays directed perpendicularly to said plane, one bundle being directed to impinge upon said object and the other bundle being directed to impinge upon said drawing, a pair of fixedly supported viewing screens, an optical system to display on one of said viewing screens an image of said object as seen from the side opposite the direction of approach of said one bundle of rays and to display on the other of said viewing screens an image of said drawing as seen from the side opposite the direction of approach of said other bundle of rays, said screens bearing fiducial marks indicating points thereon associated with a pair of fixed coincident light rays.

5. A device to measure accurately the position of points on an object relative to a predetermined two-dimensional coordinate system including a support for said object, said support being shiftable in a plane parallel to the plane of said system and having a ruled grating spaced from said object and positioned in a plane parallel to the plane of said system, mechanism operative to produce two bundles of light rays directed perpendicularly to said plane, one bundle being directed to impinge upon said object and the other bundle being directed to impinge upon said grating, a pair of fixedly supported viewing screens, an optical system to display on one of said viewing screens an image of said object as seen from the side opposite the direction of approach of said one bundle of rays, and to display on the other viewing screen an image of said grating as seen from the side opposite the direction of approach of said other bundle of rays, each of said screens having fiducial marks to indicate points thereon associated with a pair of fixed coincident light rays.

6. An apparatus for accurately determining the position of a point on an object relative to a predetermined two-dimensional coordinate system including a support member to sustain said object for shifting movements in a plane parallel to said system, mechanism operative to produce parallel light rays directed towards said object, a fixedly supported reflector positioned to intercept said rays on the side opposite said object, a first fixedly supported viewing screen disposed in the path of said rays as deflected by said reflector, a lens system to focus on said screen the image of said object where said rays impinge thereon, a second mechanism operative to produce light rays in the same direction as said first light rays, a second fixedly supported viewing screen disposed in the path of said last rays, a ruled grating mounted for shifting movements with said support member and disposed in the path of said last rays, and a lens system operative to focus on said second screen an image of said grating where said rays impinge thereon, said screens bearing fiducial marks to identify points on the images corresponding to fixed coincident light rays.

7. A device for accurately determining the position of a point on an object relative to a predetermined two-dimensional coordinate system including a fixedly supported mechanism to produce a first set of parallel light rays, a fixedly supported two-faced plane reflector disposed with one face in the path of said rays at an angle with respect thereto, fixedly supported mechanism to produce a second set of parallel light rays impinging on the opposite face of said reflector and disposed at an angle with respect thereto such that said second rays are reflected to a direction parallel to said first rays, a first fixedly supported viewing screen disposed in the path of said first rays as deflected by said reflector, a second fixedly supported viewing screen disposed in the path of said second rays as deflected by said reflector, means to support said object between said first mechanism and said reflector for shifting movements in a plane perpendicular to said first rays, a ruled grating mounted on said means in a plane perpendicular to said first rays for shifting movements with said object and positioned to intercept said second rays, a telecentric lens system to focus on said first viewing screen points on said first object as illuminated by said first set of rays and a lens system operative to focus on said second viewing screen points on said grating as illuminated by said second rays, said screens bearing fiducial markings to identify points corresponding to fixed coincident light rays.

8. An optical comparator for determining the positions of points on an object relative to a two-dimensional horizontal reference system comprising in combination a horizontally disposed plate defining a flat surface, a support member having a flat surface positioned to ride on said plate for shifting movements in a horizontal direction, said member defining a first surface to sustain said object and a second surface to sustain a drawing in a horizontal position, means to illuminate said object and said drawing by vertically directed light rays, and means operative to display images of said object and said drawing at the points said rays impinge thereon, said last means including means to identify fixed coincident light rays.

9. An apparatus for accurately determining the position of a point on an object relative to a reference drawing, including means to support said drawing and said object for shifting movements in spaced planes parallel to the plane of said drawing, a pair of optic systems including mechanism operative to produce colinear illumination along an axis perpendicular to said drawing and impinging upon both said object and said drawing, means to produce spaced images of said object and said drawing respectively at the points said illumination impinges thereon, whereby the colinearity of said optic systems establishes the point-to-point relationship and enables non-cartesian translation of points.

10. An apparatus for accurately determining the position of a point on an object relative to a reference drawing, including means to support said drawing and said object for shifting movements in spaced planes parallel to the plane of said drawing, means for producing colinear beams of light along an axis perpendicular to said drawing and impinging upon said object and said drawing respectively, a pair of fixedly supported viewing screens, optic means operative to display on one of said viewing screens an image of said object at the point of illumination by its associated light beam and to display on the other of said viewing screens an image of said drawing at the point of illumination by its associated light beam, said viewing screens bearing fiducial marks to establish a single reference axis to identify the points on said images corresponding to the reference axes of said two colinear light beams.

ROBERT E. LEWIS.

REFERENCES CITED

The following references are of record in the file of this patent:

UNITED STATES PATENTS

| Number | Name | Date |
|---|---|---|
| 1,974,654 | May | Sept. 25, 1934 |
| 2,155,248 | Adams et al. | Apr. 18, 1939 |
| 2,179,799 | Phillips | Nov. 14, 1939 |
| 2,192,529 | Thomas et al. | Mar. 5, 1940 |
| 2,393,013 | Barnes et al. | Jan. 15, 1946 |
| 2,406,451 | Borkenstein | Aug. 27, 1946 |
| 2,427,256 | Butscher | Sept. 9, 1947 |